United States Patent [19]

Walsh

[11] Patent Number: 4,635,338
[45] Date of Patent: Jan. 13, 1987

[54] METHOD AND APPARATUS FOR ASSEMBLING AN AUTOMATIC AND DISPOSABLE PENCIL

[76] Inventor: William H. Walsh, 14005 Palawan Way, Marina del Rey, Calif. 90292

[21] Appl. No.: 683,913

[22] Filed: Dec. 18, 1984

[51] Int. Cl.$^4$ .................. B23P 11/00; B23P 19/00
[52] U.S. Cl. .................................. 29/436; 29/282; 29/511; 29/525; 29/700; 29/791; 29/808; 29/822; 198/396; 198/850; 198/478.1; 401/76; 401/86; 414/745; 414/786
[58] Field of Search .......... 29/240, 282, 436, 441 BP, 29/511, 525, 791, 808, 822, DIG. 46, DIG. 73, DIG. 78, 700; 198/396, 489, 850; 401/68, 75, 76, 86; 414/745, 786

[56] References Cited

U.S. PATENT DOCUMENTS

| 1,539,468 | 5/1925 | Cook et al. | 401/75 X |
| 1,627,602 | 5/1927 | Goldsmith | 401/86 X |
| 2,046,582 | 7/1936 | Richer | 401/77 |
| 2,087,519 | 7/1937 | Lynn | 401/77 |
| 2,356,509 | 8/1944 | Deli | 401/75 |
| 2,532,791 | 12/1950 | Smith | 401/77 X |
| 3,097,628 | 7/1963 | Stoeberl | 401/77 X |
| 4,259,780 | 4/1981 | Crawford | 29/808 |

FOREIGN PATENT DOCUMENTS 454572 1/1928 Fed. Rep. of Germany .

Primary Examiner—Howard N. Goldberg
Assistant Examiner—R. S. Wallace
Attorney, Agent, or Firm—Poms, Smith, Lande & Rose

[57] ABSTRACT

A machine is shown which assembles a barrel, spring, piece of lead, lead plunger, barrel tip and eraser into an automatic pencil. The steps of assembly include: Pressing the lead plunger onto the lead. Placing the plunger and lead into the spring and tapping the plunger to turn its extending tabs into the coils of the spring. Placing the plunger, lead and spring into the barrel. Extending the spring from the barrel and pressing the barrel tip onto the spring and then pressing the tip into the barrel. Pressing the eraser into the barrel.

24 Claims, 6 Drawing Figures

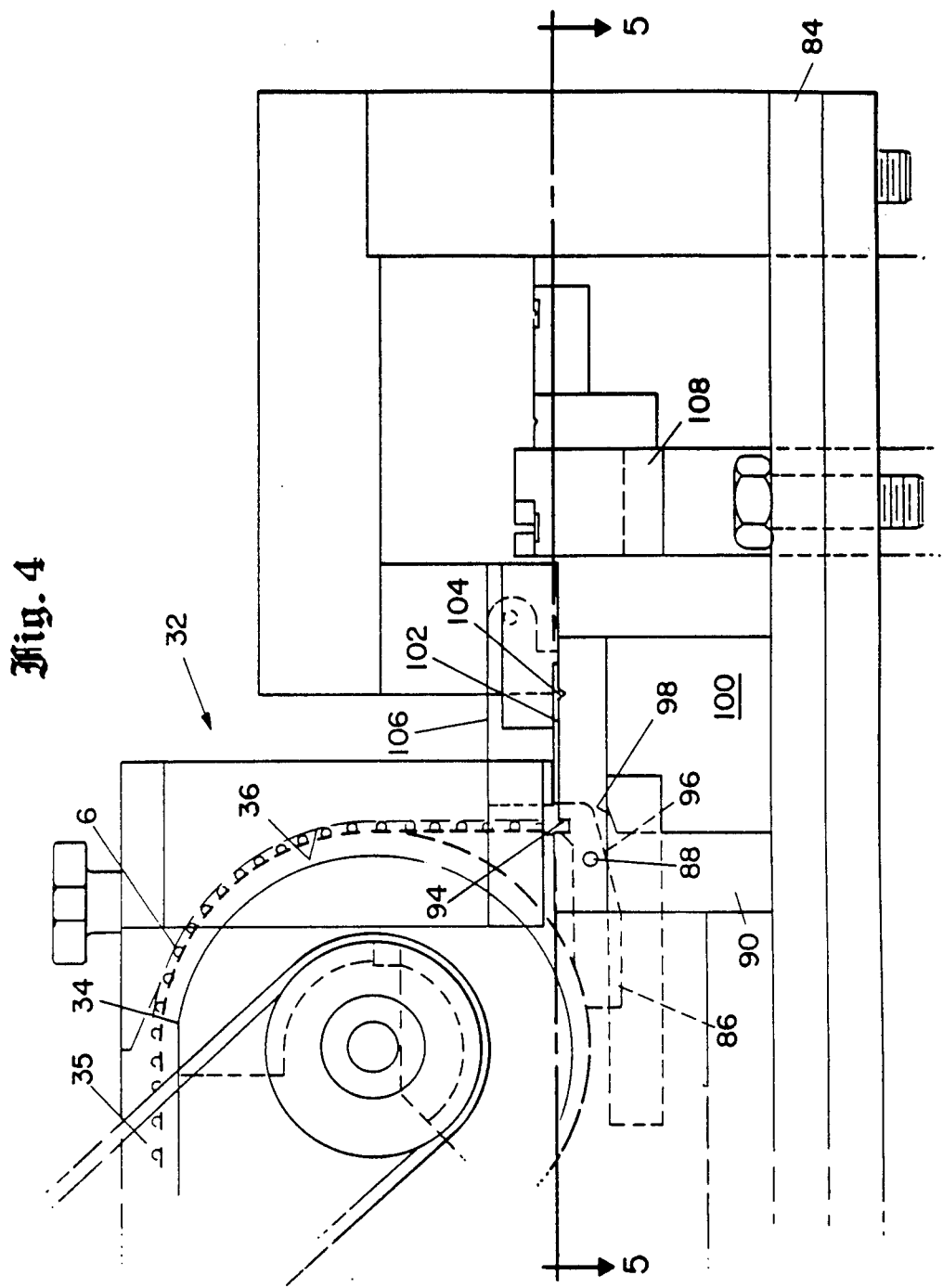

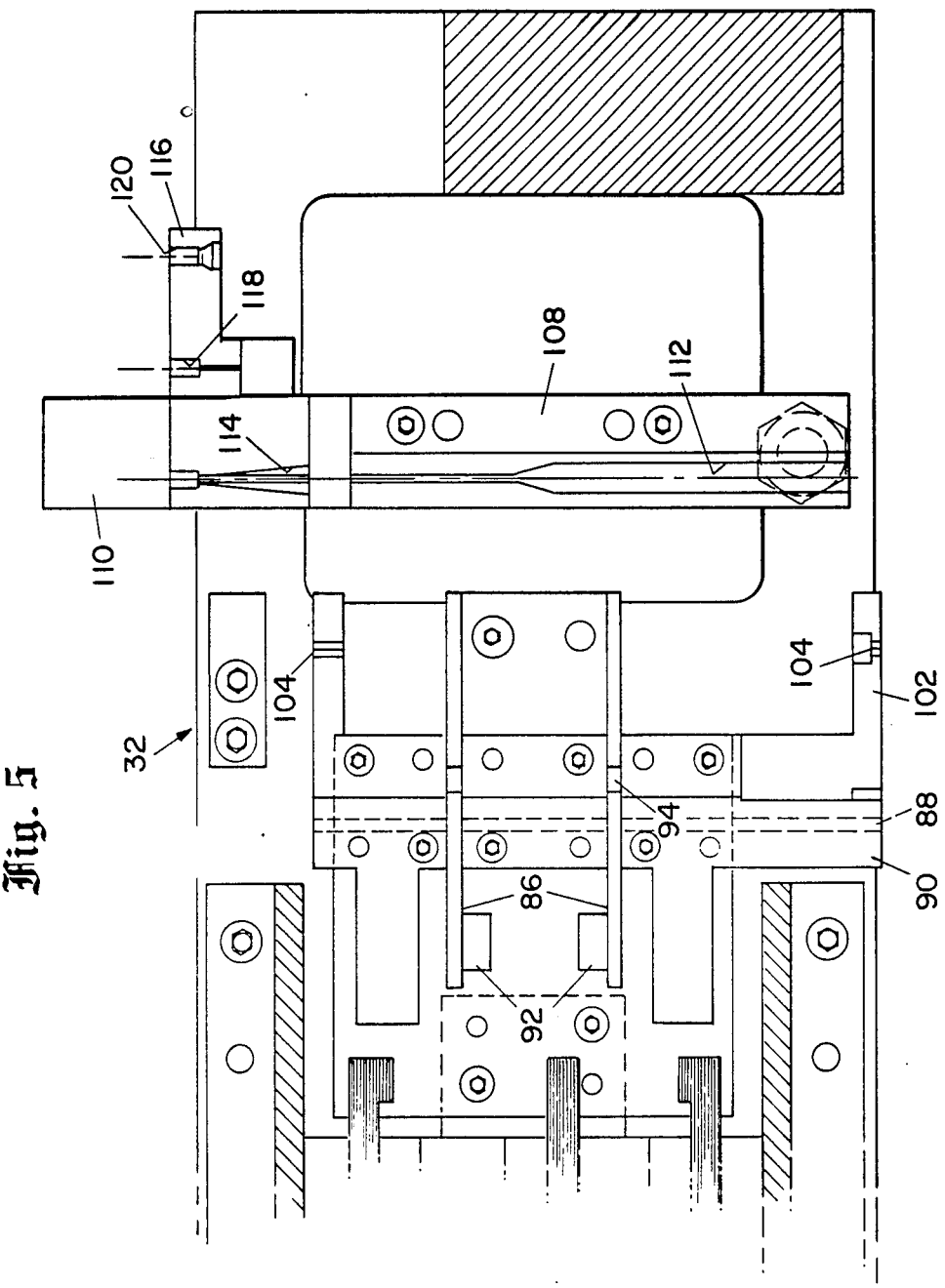

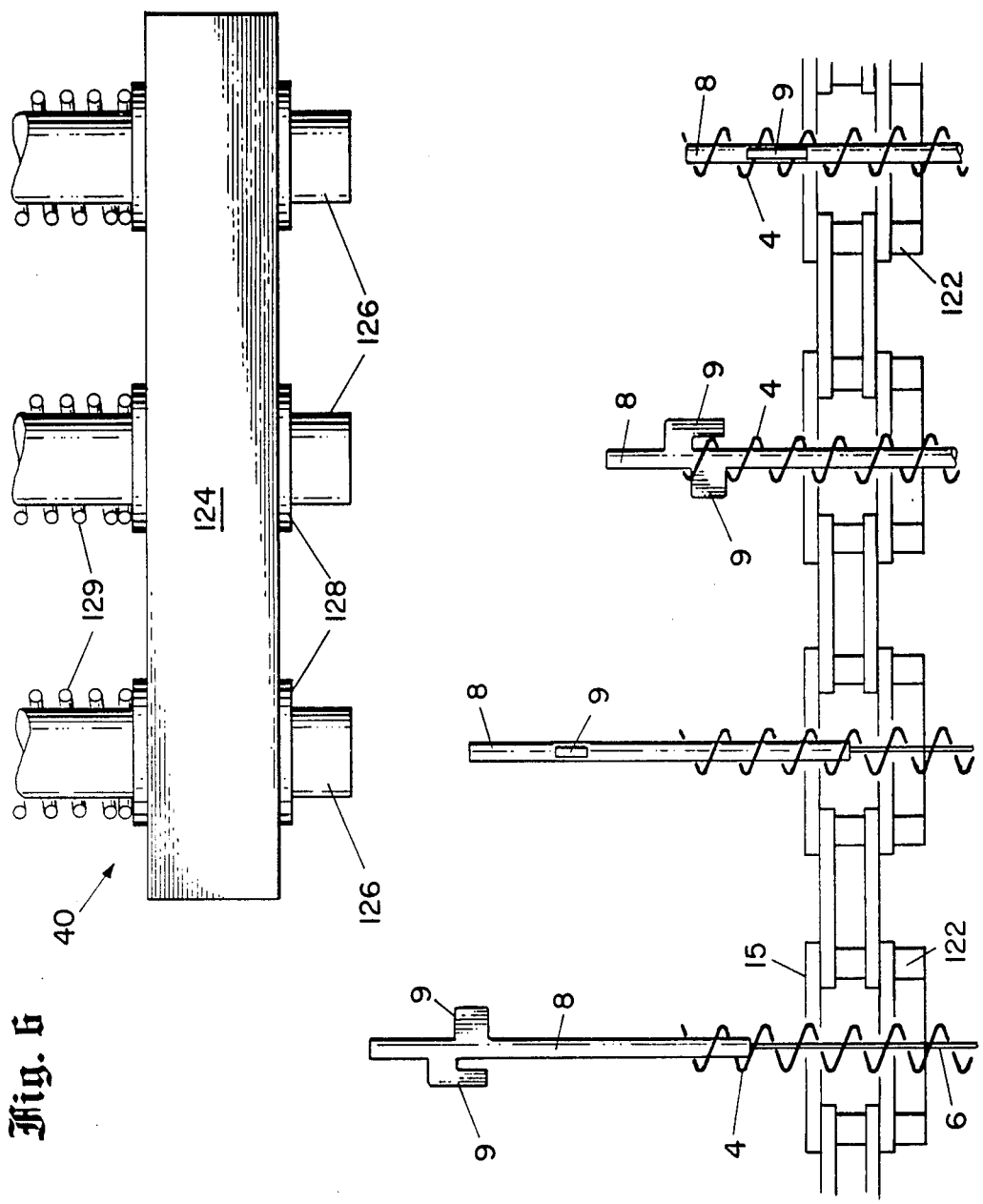

METHOD AND APPARATUS FOR ASSEMBLING AN AUTOMATIC AND DISPOSABLE PENCIL

FIELD OF THE INVENTION

The present invention relates to an assembly machine and, more particularly, to a method and machine that assembles the parts for an automatic pencil.

BACKGROUND OF THE INVENTION

Assembly machines for various devices are well known. Perhaps the most famous and first mass assemblor was Henry Ford, who created an assembly line to assemble his Ford automobile. Since that time, the automated assembly line has been refined for use in many industries.

The introduction of assembly lines has greatly reduced the cost of merchandise by eliminating manual labor. Today, such cost has been reduced to a point where many items may be assembled with the intent of disposing of them after they have been used. Such items include the ballpoint pen and the disposable razor.

The assembly machine of the present invention was created to assemble an automatic pencil which may be utilized until its lead is exhausted and then disposed of. This pencil is shown in a co-pending patent application Ser. No. 578,734, filed on Feb. 9, 1984, entitled Mechanical Pencil, now abandoned and replaced by a continuation application filed June 24, 1985, Ser. No. 747,587, which is assigned to the same assignee as the present invention.

Accordingly, a principal object of this invention provides a fast and efficient assembly machine for assembling an automatic and disposable pencil.

SUMMARY OF THE INVENTION

The foregoing object and others are accomplished by an assembly machine which utilizes two conveyor chain drives. At the beginning of the first conveyor, a spring feeder picks individual springs from a plurality of springs stored within a feedbox and transports them to a vertical storage slot where they are placed one at a time upon the first conveyor chain. The spring feeder is shown in greater detail in a co-pending patent application entitled, "Automatic Spring Feeding Device," Ser. No. 06/683,914, filed Dec. 18, 1984, by William Walsh, which is assigned to the same assignee as the present invention.

At the beginning of the second conveyor, a barrel, which forms the hand-held portion of the automatic pencil, is fed from a vibrating tray to a vertical slot and then into and across a horizontal channel where it is placed one at a time onto the second conveyor. At the same time, a lead plunger which fits onto the end of a piece of lead is transferred from a vibrating tray into a channel where it is held in a vertical position and moved toward its desired assembly station. At this station, the plunger is pressed upon the end of the piece of lead and then transferred in synchronous motion with the spring upon the first conveyor chain onto that chain. The piece of lead and lead plunger are then inserted into the spring until tabs extending from the plunger engage the spring coils and are wound into the spring by a tapping action of the transferring device.

The next step in the method of assembly is to transfer the lead, lead plunger, and spring from the first conveyor chain to the second conveyor chain. The spring, plunger and lead are then inserted into the barrel under the influence of compressed air which gently inserts the subassembly to the full depth of the barrel. The barrel is then rotated on the second conveyor chain, whereafter the spring is extended a fixed distance from the barrel. A barrel tip is transferred from a vibrating tray for storing the tip to a channel where the tip falls one at a time into an assembly area. The tip is then placed upon the end of the spring extended from the barrel and pressed into the position desired. Thereafter, the tip is pressed into the barrel.

The barrel is again rotated and passed to a next station where a supply of erasers have been transferred into a channel by a last vibrating tray. As the erasers fall into place within the channel, they are pressed into the end of the barrel. Thereafter the erasers are staked to the barrel, and the barrel and its assembled parts are dropped from the second chain conveyor into a storage bin in an assembled form.

DESCRIPTION OF THE DRAWINGS

A better understanding of the present invention and its objects will be had after careful consideration of the following detailed specification and drawings, wherein:

FIG. 4 is a side view of a lead feed machine used in the assembly machine shown in FIG. 2;

FIG. 5 is a cross-sectional view taken along lines 5—5 of FIG. 4; and

FIG. 6 is a top plane view of a plunger and lead to spring assembly machine shown in FIG. 2.

DESCRIPTION OF THE PREFERRED EMBODIMENTS

Figure 1:
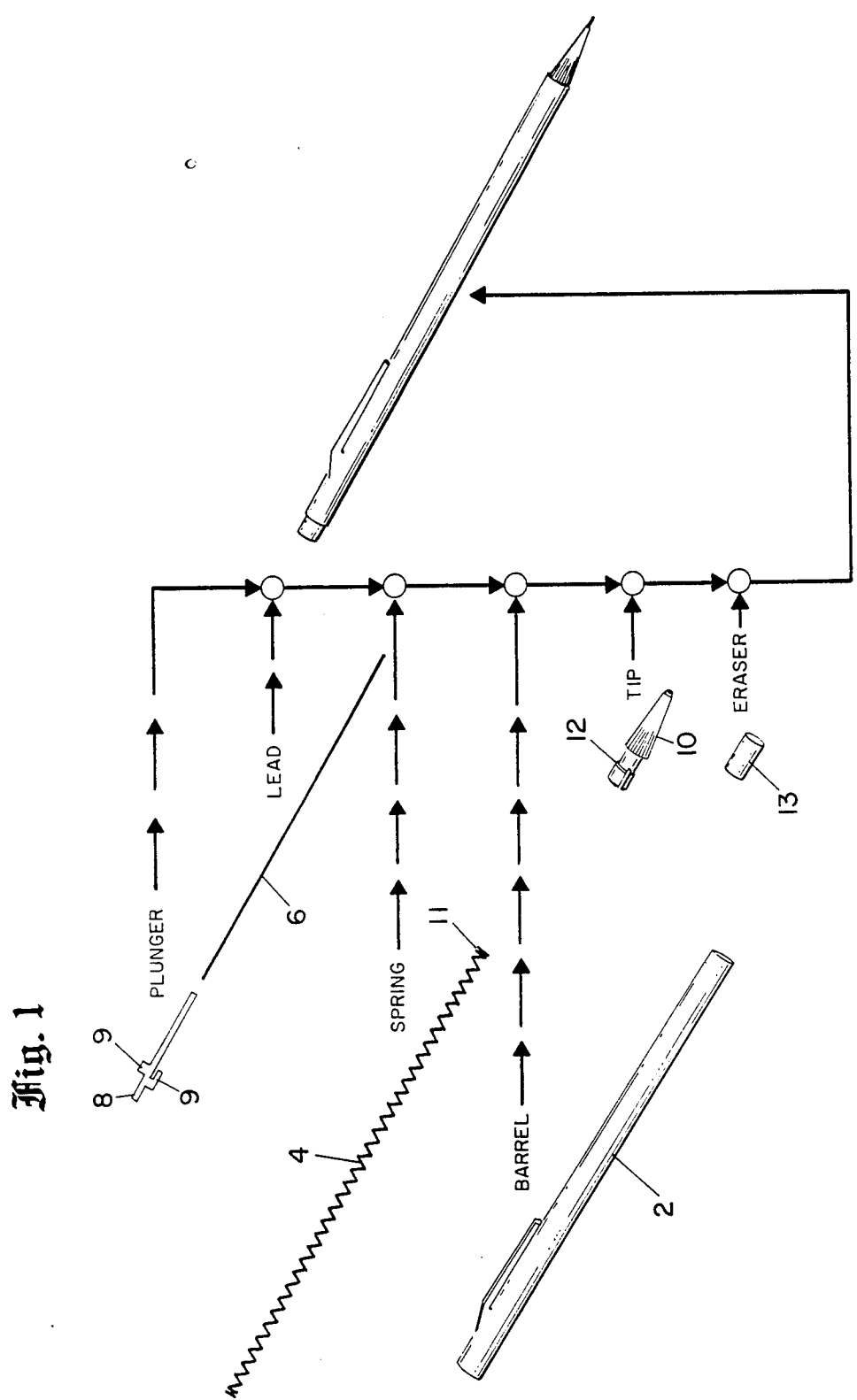
FIG. 1 is a flow chart showing the assembly steps carried out by the method and apparatus of the present invention.

The method and apparatus for assembling an automatic and disposable pencil is described briefly by the flow chart of FIG. 1, wherein the various parts that comprise the automatic pencil are shown. The parts include a barrel 2 that receives a spring 4 whose helically wound coils form a tube into which is inserted a piece of lead 6 to which is attached, as by a press fit, a lead plunger 8. The plumger 8 includes tabs 9 which extend at right angles to engage the helical coils of spring 4. The tabs 9 also engage splines, not shown, in the barrel 2 to prevent the rotation of the plunger. A barrel tip 10 is first pressed onto closely wound coils 11 at the end of the spring 4. Thereafter, the barrel tip 10 is pressed into the barrel 2 so that a shoulder 12 on the tip 10 prevents its removal while permitting rotation of the tip.

As the tip 10 turns, it causes the spring 4 to rotate for pulling the plunger 8 and lead 6 along the longitudinal axis of the barrel. Note that the splines, not shown, in barrel 2 prevent the rotation of the plunger 8 to assure a longitudinal motion of that plunger 8 and the attached lead 6 as the tip 10 is turned. The assembly of the automatic pencil is completed by the insertion of an eraser 13, which is then staked to the end of the barrel 2. As stated above under "Background Of The Invention," the automatic and disposable pencil is more fully disclosed in a co-pending patent application.

The flow chart of FIG. 1 also illustrates the order of the steps for assembling the pencil. The first step of the assembly process is to place the spring 4 and the barrel 2 respectively upon a first and second moving chain conveyor. Next, the lead 6 is taken from an automatic feeder where it is combined with the lead plunger 8 by pressing the plunger onto one end of the lead 6. The piece of lead 6 and lead plunger 8 are then inserted into spring 4 by a simple tapping action. Thereafter, the subassembly of the spring, lead, and plunger is transferred from the first chain conveyor to the second chain conveyor where the subassembly is inserted into the barrel 2. The barrel is then rotated 180 degrees and the spring is partially removed from the barrel. The tip 10 is next inserted, as by a press fit, onto the closely wound coils 11 of spring 4. Next, the tip 10 is inserted into the barrel 2 and retained therein by a press fit. Assembly of the eraser 13 is accomplished by again rotating the barrel 2 180 degrees and pressing the eraser 13 into barrel 2. A final step secures the eraser 13 to barrel 2 by staking.

Figure 2:
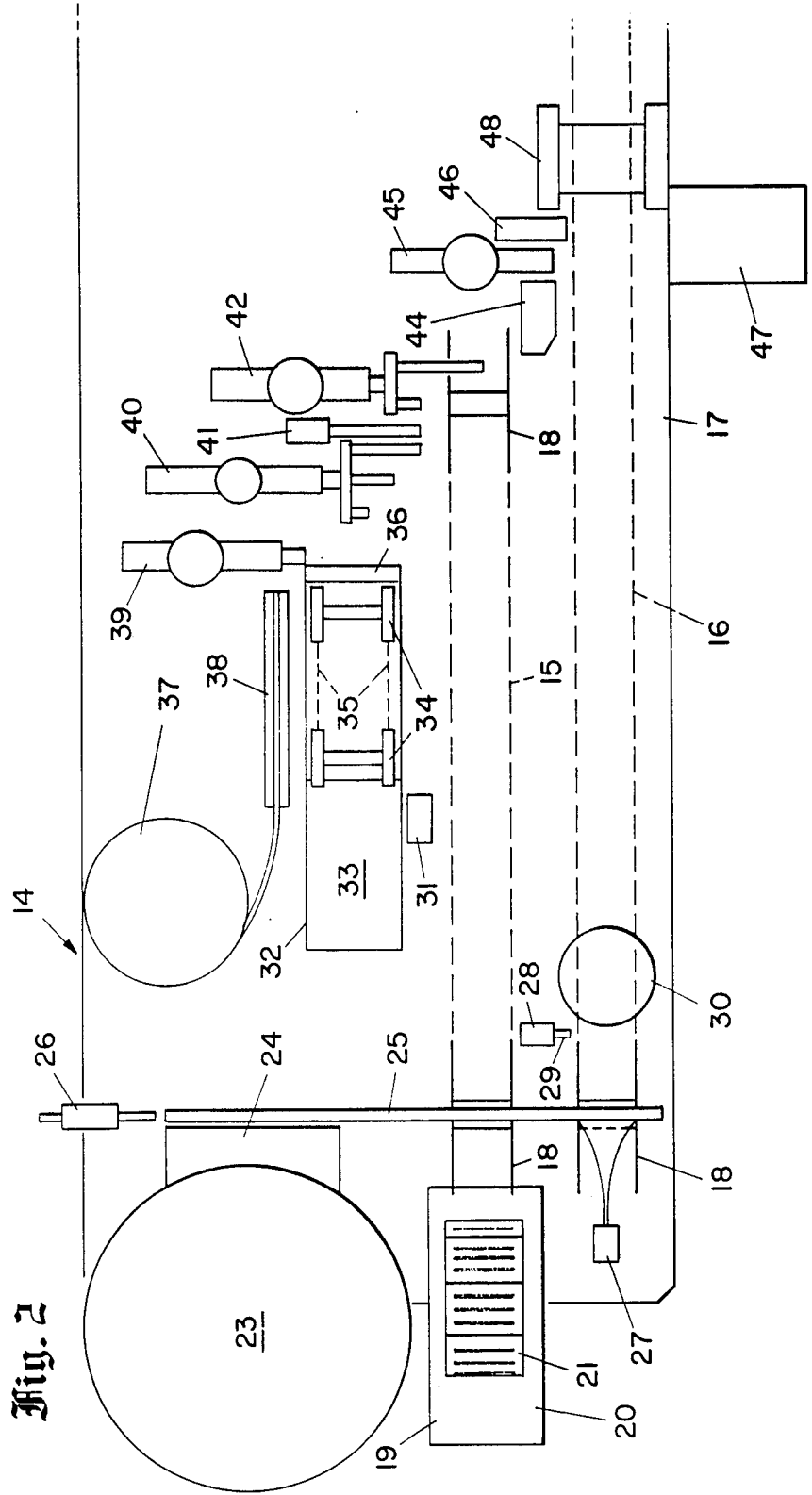
FIGS. 2 and 3 are detailed schematic drawings showing the components of the assembly machine of the present invention.
Figure 3:
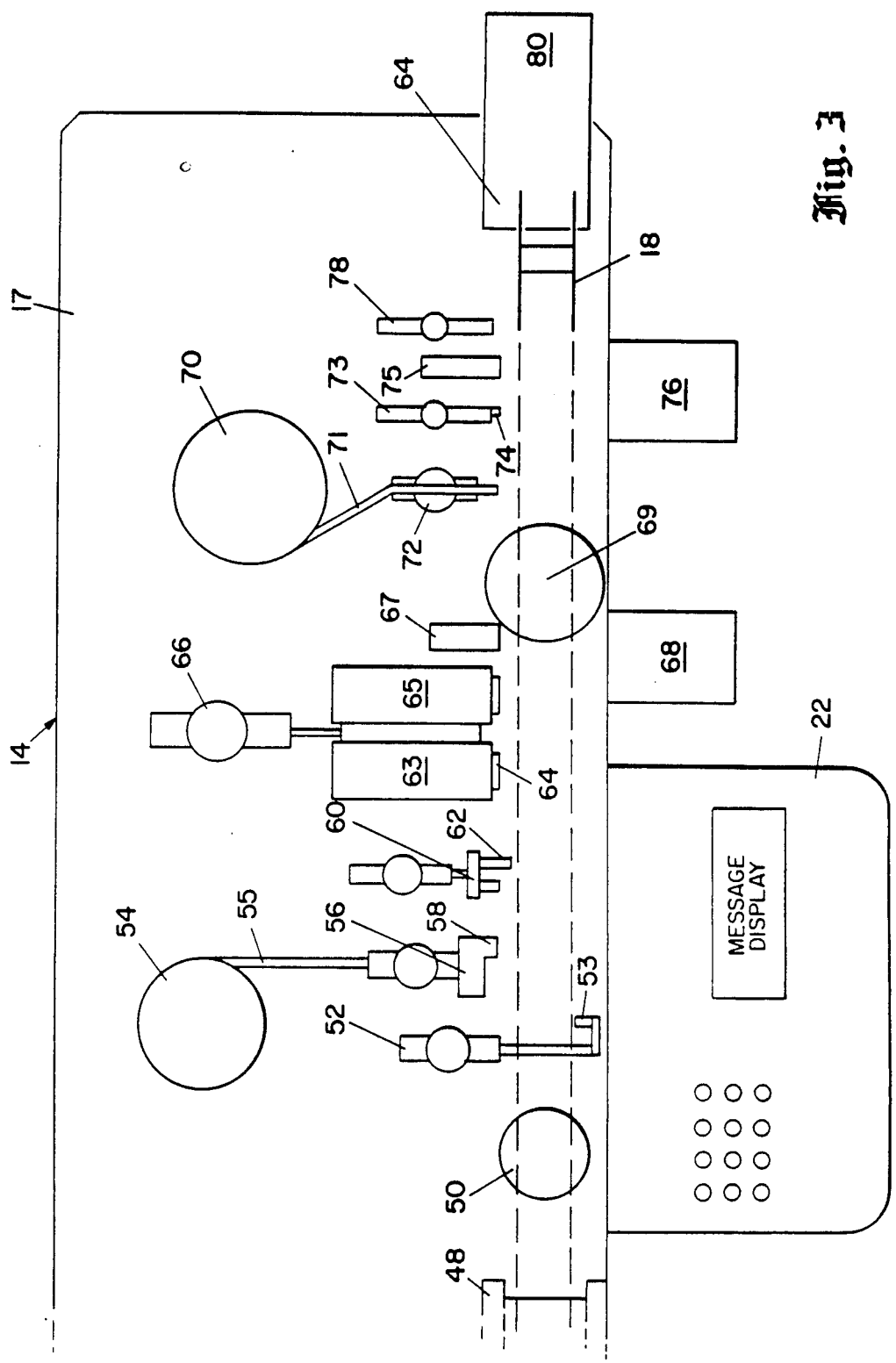

An assembly machine 14 which embodies the present invention is shown in greater detail in FIGS. 2 and 3 which may be joined end to end to show the complete machine. While assembly machines are generally known, the present invention is believed to be the first machine for assembling an automatic and disposable pencil. In FIG. 2, a first and second chain conveyor 15 and 16 are driven from left to right by motors, not shown. These same motors drive a cam shaft to which is attached several cams for driving each subassembly station in synchronous motion such that the chain conveyors 15 and 16 move one inch at a time.

As seen in FIGS. 2 and 3, the assembly machine 14, first and second chain conveyors 15 and 16, and the remaining subassembly stations, are supported on a long, rectangularly-shaped table 17. The table 17 also supports sprockets 18 which drive, and are driven by, the first and second chain conveyors 15 and 16.

On the far left-side of the table 14, in alignment with the first conveyor 15, is a spring feed assembly 19 which includes a feedbox 20 into which the springs 4 may be placed. When placed in the feedbox 20, the springs 4 have closely wound coils 11 on each end to prevent tangling. The springs 14 are removed from the feedbox 20 by a continually moving conveyor which consists of a plurality of platens 21 with grooves therein for receiving each individual spring. The spring feed assembly 19 is described in greater detail in the co-pending patent application referred to hereinabove under the "Summary Of The Invention." The spring feed assembly 19 cascades the springs 4 down a slot which, under the control of a cam mechanism, not shown, distributes the springs one at a time onto the first chain conveyor 15. The spring feed slot includes a high and low level sensor, such as a photocell. The activation of the low level sensor stops the assembly machine 14 and activates a message displayed on a control console 22, FIG. 3.

The pencil barrels 2 are loaded into a barrel loader 23 that comprises a large circular vibrating tray which moves the barrels in an outward and counterclockwise direction into a series of grooves where they are permitted to fall down a vertical slide 24. The barrels 2 are released one at a time from slide 24 to a barrel feed 25 and urged horizontally toward the second chain conveyor 16 by a reciprocating, cam driven plunger 26. The barrels then drop one at a time, under the control of a release 27, onto the second conveyor 16 where they are carried from left to right. A barrel detector 28 includes a cam-operated plunger 29 which is inserted into each barrel. The diameter of the plunger is such that it will move freely into the larger end of barrel 2 next to the clip but will not move into the smaller, opposite end thereof. A spring-loaded switch on the back of the plunger 29 opens when the plunger encounters the smaller end of barrel 2.

When the smaller end of barrel 2 is facing the first conveyor 15, a barrel orientation station 30 is activated to rotate the barrel 180 degrees so that the larger internal diameter thereof faces the first conveyor 15. The barrel orientation is accomplished by a pair of plungers that close about the barrel 2, raise the barrel from the conveyor 16, rotate 180 degrees, and return the barrel to the conveyor.

It was mentioned above that the spring 4 is provided with closely wound coils 11 on either end while handled by the spring feed assembly 19. The reason for this is to prevent the springs 4 from tangling with one another. At a shear station 31, one end 11 of the spring 4 is sheared to cut the spring to the desired length and to provide an open, helical spring which receives the lead 6 and lead plunger 8.

A lead feed machine 32 receives a supply of lead pieces 6 at a feedbox 33 which are withdrawn by drive and driven wheels 34. Wheels 34 drive a pair of notched chains 35 which carry the lead 6 to a vertical slot 36 where the lead is stacked in a column for the next step of the assembly. Each lead is removed from the slot 36 by a horizontally reciprocating cam that advances the lead to the next station where it receives the lead plunger 8, see FIGS. 4 and 5. The advantage of the pair of chains 35 in the lead feed machine 32 is that short or broken leads 6 will fall through the conveyor established thereby for sorting the unsuitable leads from the useful ones.

The lead plungers 8 are placed within a hopper 37 which, like the barrel loader 23, comprises a vibrating tray that urges the plungers 8 to the outer periphery and into a counterclockwise direction where they are assembled in a vertical orientation within a horizontal channel 38. At the end of the channel 38, a plunger-to-lead assembly machine 39 grasps each vertical plunger, rotates the plunger 90 degrees, and moves the plunger forward where it is pressed upon one end of the lead 6. Thereafter, a reciprocating cam associated with the lead feed machine 32 (FIG. 4) advances the lead and plunger through three-steps in synchronization with the conveyor 15. At each step, the plunger-to-lead machine 39 moves the lead and plunger toward, and into, the spring 4 upon conveyor 15.

As the lead and plunger is moved to the last of the three steps, a plunger and lead to spring assembly station 40, comprising a three-stage assemblier, takes over to tap the lead and plunger toward the spring. Station 40 is described in greater detail below regard to FIG. 6. It has been found that the spiral of the helically-wound spring 4 provides a sufficient inclined plane to permit the plunger 8 to be wound into the coils with nothing more than the tapping action of the assembly machine 40.

At station 41, an inspection is made for broken lead by lifting the assembled lead, plunger and spring by the lead tip. If the assembly does not lift free of a sensor, not shown, the assembly machine 14 notes the presence of a broken lead.

The next stage is a two-step transfer of the lead, plunger and spring from the first conveyor 15 to the second conveyor 16. This is done by an assembler 42, which inserts the spring into the larger end of the barrel 2 as it lifts the spring from the first conveyor 15. The lead, plunger and spring subassembly is inserted into the splines, not shown, of barrel 2 by a six-stage pneumatic jet assembly 44, which blows the lead, plunger and spring subassembly into the barrel 2. Thereafter, an inspection station 45 inserts a rod into the barrel to check if the lead, plunger and spring subassembly is properly in the barrel 2. If it is not, the barrel is ejected by an ejector 46 into a bin 47 where the barrel may be reclaimed. The reader will understand that the reclaiming of the pencil lead and assembled plunger may require more manual effort than it is worth. Further, the spring may not be reclaimed as one end thereof was sheared off at station 31.

The next step within the assembly machine is to hot stamp the barrel 2 at station 48 with an appropriate trademark, logo, or the like. During hot stamping, the barrel is oriented by an indexing clamp that rises from table 17 and grips the barrel to orient the clip in a vertical position. This permits the trademark, logo, or the like to be positioned along the barrel in parallel orientation with the clip.

The remaining portion of the assembly machine is shown in FIG. 3 wherein the table 17 supports only the second chain conveyor 16 and its driven sprocket 18. In FIG. 2, the barrel 2 was transported across the conveyor 16 with its larger internal diameter and clip facing the first conveyor 15. After the hot stamping process at station 48, the barrel is rotated 180 degrees by a barrel orientation device 50 to expose the smaller end of the barrel 2 to the assembly stations.

At the next station, the spring 4 is extended from barrel 2 by a spring advance station 52 that includes a plunger 53 which is inserted into the larger internal diameter of the barrel 2 to push the spring 4 from the barrel toward station 52. This step prepares the spring 4 for reception of the barrel tip 10 which is placed within a barrel tip feed tray 54 that comprises a vibrating tray which urges the tips to the outer edge of the tray and into a clockwise direction for passage into a tip-bearing channel 55 where the tips 10 are dropped one at a time down a vertical channel. At the bottom of the channel, a press 56 grips the spring 4 and moves the tip 10 into engagement with the closely wound coils 11 on the spring end. As the chain conveyor 16 moves the partially assembled pencel 2 to the next station, the same press actuates a second surface 58 which presses the tip 10 firmly against spring 4.

After the barrel tip 10 has been assembled to the spring 4, the barrel tip is assembled to the barrel 2 at the next station where a first plunger surface 60 engages the outer end of tip 10 against the smaller internal diameter of barrel 2. At station 62, the tip 10 is pressed all the way into barrel 2 so that shoulder 12 of the tip 10 passes beyond an internal shoulder, not shown, within barrel 2. The two shoulders retain the barrel tip 10 within the barrel 2 while permitting the rotation of the tip.

At the next station, a servo motor 63 having a shaft 64 with a conically-shaped, longitudinal aperture in its end engages the barrel tip 10 to rotate the tip and extend the lead. The presence of the lead actuates a switch for sensing the existence thereof. At the next station, a second servo motor 65 engages the tip 10 in a similar manner to return the lead to its desired position. The two motors 63 and 65 are mounted upon a platform which is moved forward and back by a suitable cam-actuated device 66 to engage and disengage tip 10. If the switch in shaft 64 sensed the absence of a lead, an ejector 67 ejects that pencil from the chain conveyor 16 into a second bin 68.

After the tip has been assembled, the pencil is rotated 180 degrees by a third barrel orientation device 69 and advanced to the next station where a load eraser assembly 70 is mounted. The eraser assembly 70 includes a vibrating tray that causes the erasers 13 to pass into a channel 71 which stacks the erasers in a vertical column. The erasers are then dropped one at a time into a press 72 where they are seated into the barrel 2. A similar press 73 moves a sensing rod 74 against the eraser to check for the presence or absence thereof. In the absence of the eraser, a switch is activated which causes an ejection lever 75 at the next station to eject the pencil into a third bin 76.

The final step of the assembly process is accomplished by station 78 which stakes the eraser 13 by piercing the end of barrel 2 for displacing the barrel material into the eraser to retain the eraser therein. The assembly of the automatic and disposable pencil thus completed, the assembled pencil is collected within a bin 80 for packaging and shipment.

Referring now to FIGS. 4 and 5, the lead feed machine 32 and its camming action are shown in greater detail mounted on a frame 84. In FIG. 4, the lead slot 36 is shown receving the lead 6 carried to the slot by chain 35. At the base of the slot 36 is a pivoted arm 86 that pivots about a pin 88 mounted in a slidable frame 90 which reciprocates to the right and left in FIGS. 4 and 5. It will be seen in FIG. 5, which is a cross-sectional view taken along line 5—5 of FIG. 4, that arm 86 is two arms having weights 92 attached to the left-hand ends thereof. Arms 86 have a pair of notches 94 that are normally aligned under the slot 36. As the frame 90 is moved to the right, the notch 94 moves one piece of lead 6 within it. A camming surface 96 on arms 86 strikes a second cam surface 98 on a fixed block 100 to raise the arms and notch 94 for lifting the lead 6 over a cam surface 102 on the moving frame 90. Arms 86 move tha lead forward 1½ inches where the plunger to lead assembly machine 39 inserts the plunger 8, as by a press fit, to one end of the lead 6. Thereafter, the lead is retracted ¼ inch to grooves 104 in cam surface 102. A second pair of pivoting arms 106 force the lead into grooves 104. As the arms 86 recycle, they pick up a second piece of lead to start the process again.

On this recycle, the lead within the groove 104 moves forward 1½ inches and comes to rest just over a lifting cam 108 slidably mounted to the frame 84. The slide mounting permits an up-down or vertical motion under the urging of a lifter 110. It will be seen in FIG. 5 that the lifter 108 is provided with a groove 112 having a larger width at its lower surface than its upper surface with a taper at its mid-section to guide the lead 6 in an upward direction.

At this station, a three-finger, cam operated plunger to spring assembler 39 moves forward with its shortest finger engaging the lead and plunger within groove 112 to move the lead and plunger in the upward direction (FIG. 5). As the lead is moved out of groove 112 it enters into a groove 114 in a fixed guide block 116. The lead 4 also enters the coils of a spring 4 carried by the first conveyor chain 15. During the next step, the conveyor chain carries the spring with its partially inserted lead and plunger to the next groove 118 in block 116. Here, the second longest finger from the cam operated plunger to lead assembler 39 pushes the lead one step further. Thereafter, the chain moves the spring and the partially inserted lead and plunger to a final groove 120 where the assembler 39 again pushes the lead and plunger yet further into a spring 4.

This last position is shown in FIG. 6 where the plunger 8 is shown partially inserted into spring 4 upon the conveyor 15. At this point, the reader should note that suitable bifurcated spring carrying brackets 122 may be attached to the conveyor chain 15 for carrying the spring 4.

In FIG. 6, the details of the plunger and lead to spring assembly machine 40 are shown. Here, the machine relies upon the configuration of the spring itself to form part of the operating machine. That is, the machine 40 consists of a pair of blocks 124, only one of which is shown in FIG. 6. These blocks mount three spring-loaded rods 126 within suitable bushings 128. As a cam moves the rods 126 forward, they contact the plunger 8 with a spring action from springs 129 that softly taps the plunger. After each tap, the tabs 9 on plunger 8 engage the helical coil of the spring 4 and turn on the inclined plane form therein. The subsequent tapping causes the tabs to turn for inserting the plunger 8 further into the coils of the spring 4. It has been found that one or two stations may be all that is necessary to tap the plunger 8 into the coils. However, the preferred embodiment incorporates three stations to assure that such insertion is complete, as shown in the far right-hand portion of FIG. 6.

In the preferred embodiment, the assembly machine 14 has been designed to turn out assembled pencils at a rate of 60 per minute. While the assembly machine has been described with some specificity, i.e., moving left-to-right, it will be understood that the machine can also move right-to-left and that the present invention should be limited only by the appended claims.

I claim:

1. A method for assembling an automatic pencil having a plurality of parts including: a barrel, a spring, a piece of lead, a lead plunger, and a barrel tip, comprising the steps of:
   placing said lead plunger upon one end of said piece of lead;
   placing said piece of lead and lead plunger into said spring;
   placing said piece of lead, lead plunger and spring into said barrel;
   extending one end of said spring opposite said plunger beyond said barrel into which it was placed;
   pressing said barrel tip upon said one end of said extended spring; and
   placing said barrel tip into one end of said barrel.

2. A method for assembling an automatic pencil, as claimed in claim 1, wherein said step of placing said piece of lead and lead plunger into said spring is carried out by the step of:
   tapping the end of said lead plunger a plurality of taps which turns said lead plunger into said spring.

3. A method for assembling an automatic pencil, as claimed in claim 1, wherein the step of placing said barrel tip into one end of said barrel is further carried out by the steps of:
   inserting said barrel tip into said barrel; and
   pressing said barrel tip into said barrel.

4. A method for assembling an automatic pencil, as claimed in claim 1, wherein said pencil further has an eraser, and an additional step comprises:
   placing said eraser into the end of said barrel opposite from said barrel tip.

5. A method for assembling an automatic pencil, as claimed in claim 4, comprising the additional step of:
   staking said eraser to said barrel to retain said eraser therein.

6. A method for assembling an automatic pencil, as claimed in claim 1, comprising the additional steps of:
   placing said spring upon a moving means to transport said spring to a location where the next step may be performed;
   placing said barrel upon a second moving means to transport said barrel to a location where the next step may be performed; and
   transferring said spring to said second moving means after said piece of lead and lead plunger have been placed into said spring.

7. A method for assembling an automatic pencil, as claimed in claim 6, wherein said step of transferring said spring to said barrel moving means includes the further steps of:
   lifting said spring, lead plunger, and lead from said first mentioned moving means; and
   moving said spring, lead plunger, and lead to said second mentioned moving means.

8. A method for assembling an automatic pencil, as claimed in claim 6, comprising the additional steps of:
   winding said spring with closely wound coils at each end thereof to prevent spring entanglement during handling;
   shearing one closely wound coil from said spring after said spring is placed upon said moving means;
   placing said piece of lead and lead plunger into said sheared end of said spring to use the spring coils as an incline plane for said lead plunger; and
   placing said barrel tip upon said closely wound coils at the end of said spring to use said coils as a platform to support said tip.

9. A method for assembling an automatic pencil, as claimed in claim 1, wherein said step of placing said lead plunger upon one end of said piece of lead is carried out by the further step of:
   holding said lead by each end as said lead is advanced toward the point where said lead plunger is placed thereon.

10. A method for assembling an automatic pencil, as claimed in claim 1, wherein the step of placing said piece of lead, lead plunger and spring into said barrel includes the step of:
    directing a stream of compressed air at the end of said lead plunger in a plurality of stages to urge said plunger, lead and spring into said barrel.

11. A method for assembling an automatic pencil, as claimed in claim 1, further including the steps, after placing said barrel tip into said barrel, of:
    turning said barrel tip to advance said lead;
    checking for the presence of said lead; and
    turning said barrel tip a second time to return said lead to a desired position.

12. A method for assembling an automatic pencil, as claimed in claim 1, further including the step, after placing said piece of lead, lead plunger and spring into said barrel of:
    stamping said barrel to transfer appropriate alphanumeric characters thereto.

13. A method for assembling an automatic and disposable pencil having a plurality of parts including: a barrel, a spring, a piece of lead, a lead plunger, a barrel tip, and an eraser, comprising the steps of:

placing said spring upon a first moving means;
placing said barrel upon a second moving means;
checking the orientation of said barrel upon said second moving means;
rotating those barrels not properly placed upon said second moving means;
shearing a portion of said spring upon said first moving means;
placing said lead plunger upon one end of said lead;
placing said lead and lead plunger into said spring;
transferring said spring, lead and lead plunger from said first moving means toward said second moving means;
placing said spring, lead and lead plunger into said barrel;
rotating the orientation of said barrel upon said second moving means;
advancing said spring from said barrel;
placing said barrel tip upon said advanced spring;
pressing said barrel tip into the end of said barrel;
rotating the orientation of said barrel upon said second moving means for a second time;
placing said eraser into said barrel opposite said barrel tip; and
staking said eraser to said barrel.

14. A method as claimed in claim 13, additionally comprising the step of:

stamping said barrel with alphanumeric characters.

15. A method, as claimed in claim 13, additionally comprising the steps, after pressing said barrel tip into the end of said barrel, of:

advancing said lead by turning said barrel tip;
checking for the presence of said lead; and
returning said lead to a desired position.

16. A method for assembling an automatic pencil having a plurality of parts including, but not limited to: a spring, a piece of lead, and a lead plunger, comprising the steps of:

placing said lead plunger upon one end of said piece of lead; and
placing said piece of lead and lead plunger into said spring by tapping said plunger to cause said plunger to turn into the coils of said spring.

17. A method for assembling an automatic pencil, as claimed in claim 16, wherein said pencil further has a barrel, and an additional step comprises:

placing said piece of lead, lead plunger and spring into said barrel.

18. A method for assembling an automatic pencil, as claimed in claim 17, wherein said pencil further has a barrel tip, and additional steps comprises:

placing said barrel tip upon one end of said spring by pressing said tip onto said spring; and
placing said barrel tip into one end of said barrel by pressing said tip into said barrel.

19. A method for assembling an automatic pencil, as claimed in claim 17, wherein said pencil further has an eraser, and additional steps comprise:

placing said eraser into one end of said barrel; and
staking said eraser into said barrel.

20. An apparatus for assembling an automatic pencil of the type which includes a barrel, a spring, a piece of lead, a plunger and a barrel tip, comprising:

means for placing said plunger upon one end of said lead;
means for placing said lead and plunger into said spring;
means for placing said lead, plunger and spring into said barrel;
means for extending one end of said spring opposite said plunger beyond said barrel into which it was placed;
means for pressing said barrel tip upon said one end of said extended spring; and
means for placing said barrel tip into one end of said barrel.

21. The apparatus of claim 20, further comprising:

means for tapping the end of said plunger a plurality of taps to advance said lead and plunger into said spring.

22. The apparatus of claim 20, further comprising:

means for inserting said barrel tip into said barrel; and
means for pressing said barrel tip into said barrel.

23. The apparatus of claim 20, wherein said pencil additionally includes an eraser, further comprising:

means for placing said eraser into the end of said barrel opposite from said barrel tip.

24. The apparatus of claim 23, further comprising:

means for staking said eraser to said barrel to retain said eraser therein.

* * * * *